United States Patent [19]

Jeanmart et al.

[11] 3,748,333

[45] July 24, 1973

[54] PALLADIUM HYDROGENATION PROCESS FOR 3,4 DIHYDROISOQUINALINES

[75] Inventors: Claude Jeanmart, Brunoy; Mayer Naoum Messer, Bievres; Pierre Simon, Montrouge, all of France

[73] Assignee: Rhone-Poulenc S.A., Paris, France

[22] Filed: Jan. 19, 1971

[21] Appl. No.: 107,859

[30] Foreign Application Priority Data
Jan. 21, 1970 France .................................. 7002128

[52] U.S. Cl...... 260/286 R, 260/286 Q, 260/288 A, 260/690, 260/288 R
[51] Int. Cl. .......................................... C07d 35/14
[58] Field of Search .................... 260/288 R, 288 A, 260/286 R

[56] References Cited
UNITED STATES PATENTS

| | | | |
|---|---|---|---|
| 2,823,235 | 2/1958 | Graham | 260/288 R |
| 3,652,570 | 3/1972 | Gittos | 260/288 R |
| 2,666,059 | 10/1954 | Davis | 260/288 R |
| 3,452,026 | 6/1969 | Perron | 260/288 R |

OTHER PUBLICATIONS

Lyle et al., in Katrisky et al. "Advances in Heterocyclic Chemistry" Vol. 6, Academic Press, 1966 p. 68–70

*Primary Examiner*—Donald G. Daus
*Attorney*—Stevens, Davis, Miller & Mosher

[57] ABSTRACT

3,4-Dihydroisoquinolines having antitussive and antifibrillating properties of formula:

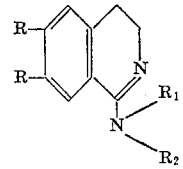

wherein the symbols R represent hydrogen or methoxy or together form a methylenedioxy group, $R_1$ represents hydrogen or alkyl, and $R_2$ represents alkyl or dialkylaminoalkyl, are prepared by hydrogenation of a corresponding isoquinoline derivative employing a palladium catalyst.

4 Claims, No Drawings

PALLADIUM HYDROGENATION PROCESS FOR 3,4 DIHYDROISOQUINALINES

This invention relates to a new process for the preparation of therapeutically useful derivatives of 3,4-dihydroisoquinoline.

In the specification of U.S. application Ser. No. 804,672 applied for on March 5, 1969 now U.S. Pat. No. 3,644,366, by C. Jeanmart, M.N. Messer and P.E. Simon and assigned to the same assignee as this application, viz. Rhone-Poulenc S.A., a French body corporate, of Paris, France, there are described inter alia 3,4-dihydroisoquinoline derivatives of the general formula:

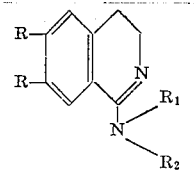

(wherein the symbols R are the same or different and each represents a hydrogen atom or a methoxy group or together form a methylenedioxy group, $R_1$ represents a hydrogen atom or an alkyl group, and $R_2$ represents an alkyl or dialkylaminoalkyl group, the alkyl groups and alkyl moieties of the dialkylaminoalkyl group containing 1 to 5 carbon atoms) and acid addition and quaternary ammonium salts thereof, which possess pharmacodynamic properties and are very active as antitussive and antifibrillating agents.

The aforesaid specification describes a process for the preparation of the 3,4-dihydroisoquinoline derivatives which comrpises reacting an amino of the general formula:

(wherein $R_1$ and $R_2$ are as hereinbefore defined) with a 3,4-dihydroisoquinoline derivative of the general formula:

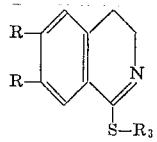

(wherein $R_3$ represents an alkyl group containing 1 to 3 carbon atoms, and the symbols R are as hereinbefore defined) or an acid addition salt thereof, preferably the hydroiodide.

It has now been found as a result of research and experimentation that the 3,4-dihydroisoquinoline derivatives of general formula I, or acid addition or quaternary ammonium salts thereof, can be obtained by a new and different process which comprises catalytically hydrogenating an isoquinoline derivative of the general formula:

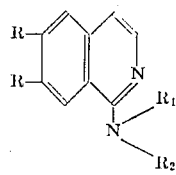

(wherein the various symbols are as hereinbefore defined), and if desired converting by known methods a 3,4-dihydroisoquinoline base thus obtained into an acid addition or quaternary ammonium salt. The reduction of the isoquinoline derivative is preferably carried out with hydrogen in the presence of a palladium catalyst, for example palladium on calcium carbonate. Advantageously it is then carried out at atmospheric pressure, e.g. about 760 mm.Hg, and at ambient temperature, e.g. about 20°C., in an inert organic solvent such as ethanol. Preferably the isoquinoline starting material is used in the form of an acid addition salt, for example the hydrochloride.

The isoquinoline derivatives of general formula IV can be obtained by reaction of an amine of general formula II with an isoquinoline of the general formula:

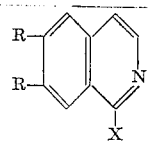

wherein the R symbols are as hereinbefore defined, and X represents the acid residue of a reactive ester, preferably a halogen atom.

The 3,4-dihydroisoquinoline derivatives of general formula I obtained by the process of the present invention may be purified by physical methods such as distillation, crystallization or chromatography, or by chemical methods such as the formation of salts, crystallization of the salts and decomposition of them in an alkaline medium. In carrying out the said chemical methods, the nature of the anion of the salt is immaterial, the only requirement being that the salt must be well-defined and readily crystallizable.

The 3,4-dihydroisoquinoline derivatives of formula I may be converted by known methods into acid addition and quaternary ammonium salts. The acid addition salts may be obtained by the action of acids on the 3,4-dihydroisoquinoline derivatives in appropriate solvents. As organic solvents there may be used, for example, alcohols, ethers, ketones or chlorinated hydrocarbons. The salt which is formed is precipitated, if necessary after concentration of its solution, and is separated by filtration or decantation. The quaternary ammonium salts may be obtained by the action of esters on the 3,4-dihydroisoquinoline bases, optionally in an organic solvent, at room temperature or more rapidly, with gentle heating.

By the term "known methods" as used in this specification is meant methods heretofore used or described in the chemical literature.

The following Example illustrates the process according to the invention.

EXAMPLE

A 4N solution of hydrochloric acid in diethyl ether is added to a solution of 1-(2-diethylaminoethylamino)isoquinoline (0.42 g.) in ethanol (20 cc.) until pH 4 is reached, and palladium on calcium carbonate (0.7 g.) containing 11 percent by weight of palladium is then added. Hydrogenation is carried out for 2 hours at 25°C. under a pressure of 760 mm.Hg. The catalyst is filtered off and washed with ethanol (2 × 5 cc.). The ethanol solutions are combined and then concentrated under reduced pressure (30 mm.Hg). The residual oil (0.61 g.) is taken up in water (10 cc.) and the solution is rendered alkaline by addition of 10N aqueous sodium hydroxide solution until pH 11 is reached. An oil separates out and is extracted with methylene chloride (2 × 10 cc.). The combined organic extracts are dried over sodium sulphate and then concentrated under reduced pressure (30 mm.Hg). The residual oil (0.37 g.) is dissolved in acetone (5 cc.) and the solution is poured into a column of 1.2 cm. diameter containing silica (7 g.).

A mixture of starting material and 1-(2-diethylaminoethylamino)-3,4-dihydroisoquinoline is obtained by elution with acetone (400 cc.). Thereafter, elution with methanol containing 2 percent of ammonia ($d$ = 0.89) (500 cc.) yields 1-(2-diethylaminoethylamino)-3,4-dihydroisoquinoline (0.25 g.) in the form of an oil, which is homogeneous in distribution chromatography on a thin layer of silica gel [solvent:acetone - methanol - ammonia (25-75-2.5 by volume); Rf = 0.3].

This oil is dissolved in ethanol (2 cc.). A 4N solution of hydrochloric acid in diethyl ether is added until pH 2 is reached. A product crystallizes out and is filtered off and washed with diethyl ether (2 × 1cc.) to yield 1-(2-diethylaminoethylamino)3,4-dihydro-isoquinoline dihydrochloride (0.11 g.), melting at 233°C.

1-(2-Diethylaminoethylamino)isoquinoline can be prepared according to R.D. Haworth and S. Robinson, J. Chem. Soc., 777 (1948).

I claim:

1. Process for the preparation of a 3,4-dihydroisoquinoline of the formula:

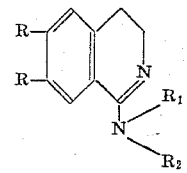

wherein the symbols R are each hydrogen or methoxy or together are methylenedioxy, $R_1$ is hydrogen or alkyl of 1 to 5 carbon atoms, and $R_2$ is alkyl of 1 to 5 carbon atoms or dialkylaminoalkyl in which each alkyl is of 1 to 5 carbon atoms, which consists of hydrogenating an isoquinoline of the formula:

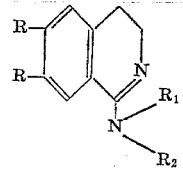

wherein R, $R_1$ and $R_2$ are as hereinbefore defined in the presence of a palladium catalyst.

2. Process according to claim 1 in which the catalyst is palladium deposited on calcium carbonate.

3. Process according to claim 1 in which the hydrogenation of the isoquinoline is carried out in solution in ethanol at atmospheric pressure and ambient temperature.

4. Process according to claim 1 in which the isoquinoline starting material is employed in the form of an acid addition salt.

* * * * *